Sept. 4, 1956  R. S. LONG ET AL  2,761,758
PROCESS FOR RECOVERY OF URANIUM
Filed Aug. 4, 1950  4 Sheets-Sheet 2

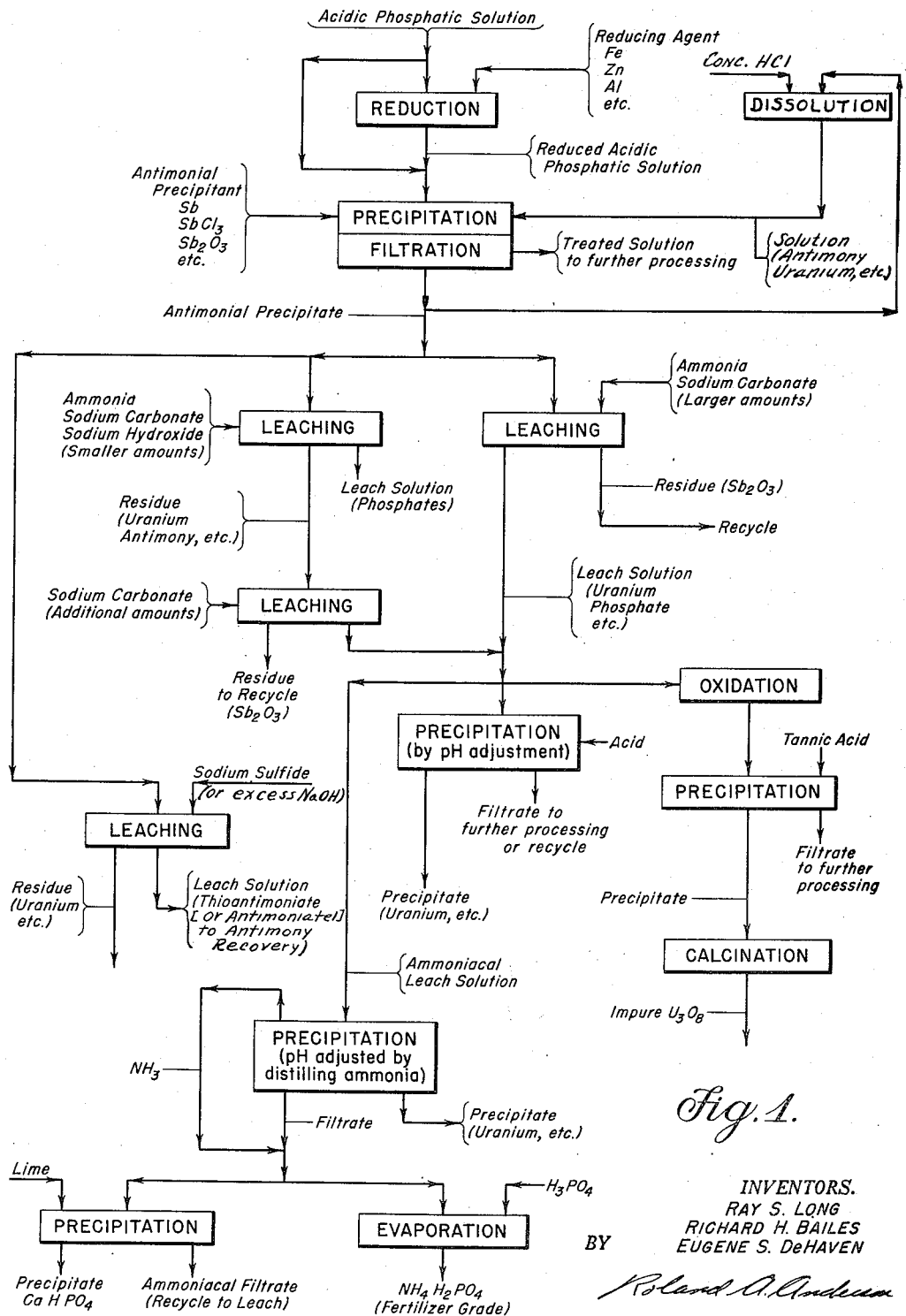

INVENTORS.
RAY S. LONG
RICHARD H. BAILES
EUGENE S. DeHAVEN
BY
Roland A. Anderson
ATTORNEY.

Sept. 4, 1956 R. S. LONG ET AL 2,761,758
PROCESS FOR RECOVERY OF URANIUM
Filed Aug. 4, 1950 4 Sheets-Sheet 3

INVENTORS.
RAY S. LONG
RICHARD H. BAILES
BY EUGENE S. DeHAVEN

Roland A. Anderson
ATTORNEY.

United States Patent Office 2,761,758
Patented Sept. 4, 1956

2,761,758

PROCESS FOR RECOVERY OF URANIUM

Ray S. Long, Vallejo, Richard H. Bailes, Walnut Creek, and Eugene S. De Haven, Concord, Calif., assignors, by mesne assignments, to the United States of America as represented by the United States Atomic Energy Commission Application August 4, 1950, Serial No. 177,728

13 Claims. (Cl. 23—14.5)

This invention relates to the recovery of uranium and, more particularly, to the recovery of uranium from acidic phosphatic solutions.

Uranium is widely distributed in nature. While only a relatively few extensive high-grade deposits are known, there exist many large deposits of low-grade ores. The recovery of uranium from these sources is, ordinarily, infeasible as a primary process; often, however, such ores are utilized in various metallurgical processes and the possibility arises of recovering the uranium as a secondary operation. For example, extremely large phosphatic deposits exist in which there is a small uranium content. These phosphatic ores are employed in the production of triple super-phosphate fertilizers and industrial phosphoric acids by processes wherein sulfuric acid is employed to leach the phosphate from the ore and wherein the uranium and other materials are also leached into the acid yielding an acidic phosphatic solution having a considerable complexity of composition.

Uranium is highly soluble in such a solution due to complexing of the uranium by the phosphate and the problem of recovering uranium from such a solution is further complicated both by the relatively high phosphate content of the solution and the low content of uranium.

Now it has been discovered that the uranium may be recovered from such solutions by precipitation with various antimony compounds and that said precipitation is particularly efficacious following reduction of the uranium in the solution to the tetravalent state. The uranium is subsequently recovered from the precipitate by various methods which will be more fully described hereinafter.

Accordingly, it is an object of the invention to recover uranium from acidic phosphatic solutions.

Another object of the invention is to precipitate uranium from an acidic phosphatic solution by means of antimony compounds.

Another object of the invention is to provide processes for the recovery of uranium from acidic phosphatic solutions wherein the uranium is precipitated from said solutions with an antimony compound following reduction of the uranium to the tetravalent state in the solutions.

A further object of the invention is to provide leaching methods for recovering uranium from an antimonial precipitate derived from an acidic phosphatic solution.

Another object of the invention is to provide methods for recovering uranium from leach solutions derived from an antimonial precipitate.

A still further object of the invention is to provide integrated industrial plant processes for recovering uranium from acidic phosphatic solutions employing antimonial precipitation of the uranium and providing for recovery of the uranium from the antimonial precipitate and recycling of the reagents.

Other objects and advantages of the invention will become apparent from a consideration of the following description when taken in conjunction with the accompanying drawings of which:

Figure 7 is a graphical illustration of the amounts of uranium, antimony and phosphate leached from antimonial precipitates by various amounts of leaching agents.

The processes of the invention are suitable for recovering uranium from a large variety of acidic phosphatic solutions such as those which are obtained during various stages of superphosphate and industrial phosphoric acid manufacture as by-products, intermediate products or as final products. Typically, such a solution may contain the materials as indicated in Table I, and including small amounts of other materials.

TABLE I

| | | |
|---|---|---|
| $U_3O_8$ | mg./l. | 105 |
| $H_3PO_4$ | g./l. | 330 |
| V | g./l. | 1.40 |
| Fe | g./l. | 3.02 |
| Ca | percent | 0.155 |
| Mg | do | 0.20 |
| Al | do | 0.34 |
| F | do | 1.13 |
| Sulfate | do | 1.22 |
| Sp. gr. | | 1.207 |

However, solutions differing very considerably in composition from that indicated either in relative concentrations or in the types of ions present may also be processed satisfactorily. Moreover, phosphate may be added to acidic uranium solutions and the uranium recovered by the processes. It is contemplated that most phosphatic solutions which contain sufficient phosphate ions to form a precipitate with the added antimony and which are sufficiently acidic may be treated to precipitate the uranium by the processes of the invention.

Figure 1:
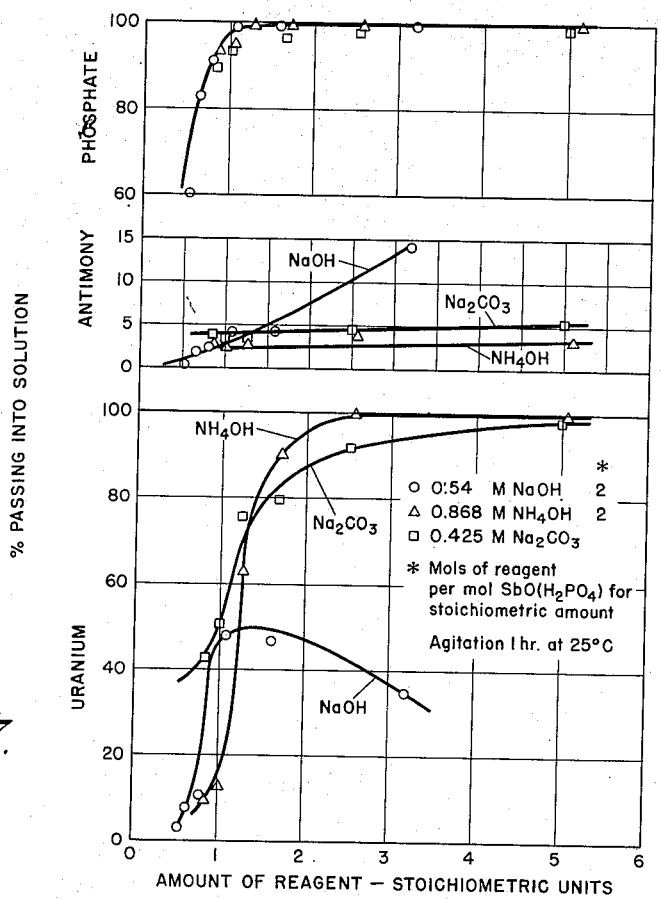
Figure 1 is a flowsheet illustrating the processes of the invention.

With reference to the flowsheet of Fig. 1, and in accordance with the invention, a phosphoric solution of the character described, is preferably subjected to a reducing treatment, whereby all of the uranium contained therein is reduced to the tetravalent state. The reduction of the uranium to the tetravalent state may be accomplished utilizing a wide variety of reducing agents including metallic reducing agents such as iron, zinc, zinc amalgam, aluminum, lead, or antimony, or by using organic agents such as hydrazine and hydroxylamine salts. Other materials having a sufficiently high reduction potential may also be used.

Progress of the reduction is easily followed by observing the electromotive potential developed between platinum and saturated calomel electrodes immersed in the solution. A value of about 0.0 volt or above indicates sufficient reduction for a phosphatic solution having approximately the composition indicated above. (Solutions having a more negative potential are in a more oxidized state.) Of course, for solutions having a quite different composition a value somewhat different from that indicated must be attained as may be readily understood from usual electrolytic theory.

Following reduction, an antimony compound is added to the solution with vigorous agitation whereby an antimonial precipitate containing the uranium together with a variety of other mtaerials is obtained. A variety of antimony compounds including antimony trioxide, antimony trichloride, potassium antimony tartrate and antimony metal itself may be utilized to precipitate the uranium. Any antimony compound which reacts with the acidic phosphatic solution to form the insoluble antimonial oxy-phosphate appears to be applicable for the purposes of the invention. Of these compounds, antimony trioxide is preferred for practical and economic reasons. The reduction step may be eliminated if antimony metal is employed since the metal appears to be capable of reducing the solution sufficiently to effect a useable precipitation. Moreover, in some cases the reducing step may be dispensed with, since if the amounts of precipitant employed are increased several-fold over that required for reduced solutions, a precipitation efficiency from hexavalent uranium solutions is obtained which is comparable to that obtained with reduced solutions.

The mechanism for the precipitation of the uranium is not completely understood; however, it appears that the compound, $SbO(H_2PO_4)$, forms on the addition of the antimony compound or of the metal with which compound uranium is coprecipitated probably as a phosphate. Using antimony trioxide as an example, the following reaction appears to take place:

$$Sb_2O_3 + 2H_3PO_4 = 2SbO(H_2PO_4) + 3H_2O$$

Uranium recoveries with the various antimony compounds increase with increasing amounts of antimony and is increased with increasing amounts of agitation employed during precipitation. More complete reduction of the solution also increases the recovery while higher temperatures of the solution during processing in the presence of air decreases uranium recoveries since the oxidation of the uranium to the hexavalent state is hastened by higher temperatures.

Figure 2:
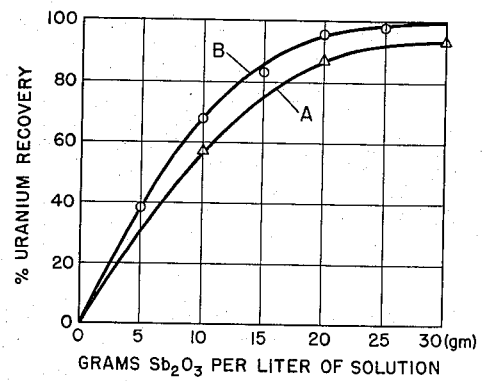
Figure 2 is a graphical representation of the relationship between amounts of antimony trioxide precipitant and the amount of uranium of various oxidation states precipitated from phosphoric acid solutions.

The effect of the state of reduction and amount of antimony trioxide precipitant upon uranium recoveries from a solution having a composition similar to that indicated above is graphically illustrated in Fig. 2. With reference to Fig. 2, the amount of precipitant added is indicated along the abscissa scale and the uranium recovery in percentage is indicated along the ordinate scale. Curve A was obtained with unreduced phosphatic solution (which contained uranium in both the urnayl and uranous oxidation states) by agitation with antimony trioxide for 16 hours at 25° C. while curve B was obtained from an identical solution which had been reduced to above zero volts with iron, by agitation with the antimony trioxide for 2 hours, at the same temperature. Similar effects are noted with the other antimonial precipitants.

It has been noted that when the percentage of uranium recovered is plotted as a function of the logarithm of the agitation time, a straight line is obtained. The practical significance of this relationship is indicated by the following experiments: Ten grams of antimony trioxide, added to a phosphatic solution having a composition similar to that indicated above and reduced to zero volts, coprecipitated 60% of the uranium with 2 minutes agitation at 25° C. while 80% of the uranium was coprecipitated with 2000 minutes' agitation. A similar effect is to be expected with other antimony compounds. Different amounts of antimony compound may produce a considerable effect upon the amount of agitation required, larger amounts of the antimony compound requiring much less agitation time to effect similar precipitations of uranium.

Uranium may be recovered from the antimonial precipitate by methods wherein the uranium is leached from the precipitate or, alternatively, wherein antimony and/or phosphate and other materials are leached from the precipitate leaving a residue in which the proportion of uranium is considerably enriched.

For example, uranium may be leached from the antimonial phosphate precipitate by treatment with a stoichiometric excess of ammonia or carbonate solution. More particularly, an ammonia solution of less than about 4M concentration and containing more than the stoichiometric amounts of ammonia is reacted with the antimonial precipitate whereby the uranium and phosphate are leached from the precipitate and the antimonial phosphate is converted into antimony trioxide, presumably, by the following reaction:

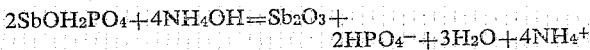

After filtering the residual precipitate from the ammoniacal solution, uranium may be precipitated from the ammoniacal filtrate by lowering the pH of the solution by appropriate means to yield a considerably beneficiated uranium-bearing product. Advantageously, the pH of the solution may be lowered by distilling off the ammonia resulting in the formation of a precipitate assaying about 12% $U_3O_8$. The properties of this precipitate indicate that it contains a fairly large proportion of aluminum phosphate. In addition to aluminum, this precipitate contains some antimony, vanadium, chromium, iron, calcium, magnesium, and titanium. It appears from experimental results that the uranium is coprecipitated with the aluminum phosphate and that the presence of aluminum increases the amount of uranium precipitated.

Ammonia distilled from the solution may be redissolved in the filtrate during the distillation and lime later added to precipitate the phosphate as $CaHPO_4$ which may be filtered from the solution yielding an ammonia solution which is suitable for recycling. The calcium acid phosphate may then be used in other industrial processes.

Alternatively, phosphoric acid may be added to the ammoniacal filtrate and fertilizer-grade $NH_4H_2PO_4$ obtained by evaporation. In this alternative method almost all of the antimony leached by the ammonia is precipitated as $SbOH_2PO_4$ and may be recovered and recycled. A fourfold stoichiometric excess of sodium carbonate dissolves uranium quantitatively from the antimonial precipitate. With less sodium carbonate, the acidity of the antimonial precipitate destroys the carbonate and less uranium is leached until, as the amount of sodium carbonate is reduced to less than about equivalent stoichiometric amounts, the uranium dissolution drops very rapidly. Uranium contained in the sodium carbonate leach solution may be precipitated by acidification and removal of carbonate as by boiling.

If somewhat less than the stoichiometric amounts of ammonia, sodium carbonate or sodium hydroxide are employed to leach the antimonial precipitate, substantially all of the phosphate may be removed from the precipitate leaving substantially all of the uranium in the precipitate together with the antimony. The uranium may then be dissolved from the leached precipitate together with the remaining small amount of phosphate employing additional quantities of another solution such as one of sodium carbonate and the uranium may then be precipitated from this latter solution by a reduction in pH following elimination of the carbonate. Moreover, the antimony will have been converted into antimony trioxide during this treatment and may be recycled.

The uranium contained in the ammonia or sodium carbonate leach solutions may also be precipitated and recovered by conversion of the uranium to the uranyl state by oxidation as with peroxides or permanganate followed by precipitation with tannic acid. A precipitate obtained in this fashion may be filtered from the solution and converted into a uranium oxide by calcination at high temperatures. Experimentally, a synthetic solution formulated to correspond roughly to a carbonate leach solution obtained from an antimonial precipitate and containing 121 grams/liter of $Na_2HPO_4$, 10 grams/liter of $Na_2CO_3$ and 1.79 grams/liter of uranyl nitrate was treated with 3 grams of tannic acid to each gram of $U_3O_8$ equivalent of uranium contained therein. 92% of the uranium was recovered in a precipitate which, when ignited, assayed 13% $U_3O_8$ and 52% phosphate. Some ammonium diuranate may also be precipitated in the case of the ammonia solutions without, however, interfering with the quality of the final product.

A major portion of the antimony may be dissolved from the antimonial precipitate by leaching with aqueous sodium sulfide ($Na_2S.9H_2O$) solution or with a several fold excess of sodium hydroxide thereby resulting in the formation of a residue in which the proportion of uranium is substantially enriched.

The antimonial precipitates obtained as above may also be dissolved in concentrated hydrochloric acid and employed in a series of cascade precipitations and dissolutions employing fresh quantities of the acidic phosphatic solutions, each time redissolving the precipitate in concentrated hydrochloric acid, resulting in the precipitation of additional quantities of uranium from the acidic phosphatic solutions with a final marked enhancement in the proportion of uranium contained in the antimonial precipitate.

The principles enunciated above may be adapted to the recovery of uranium on a large-scale as described hereinafter.

Figure 3:
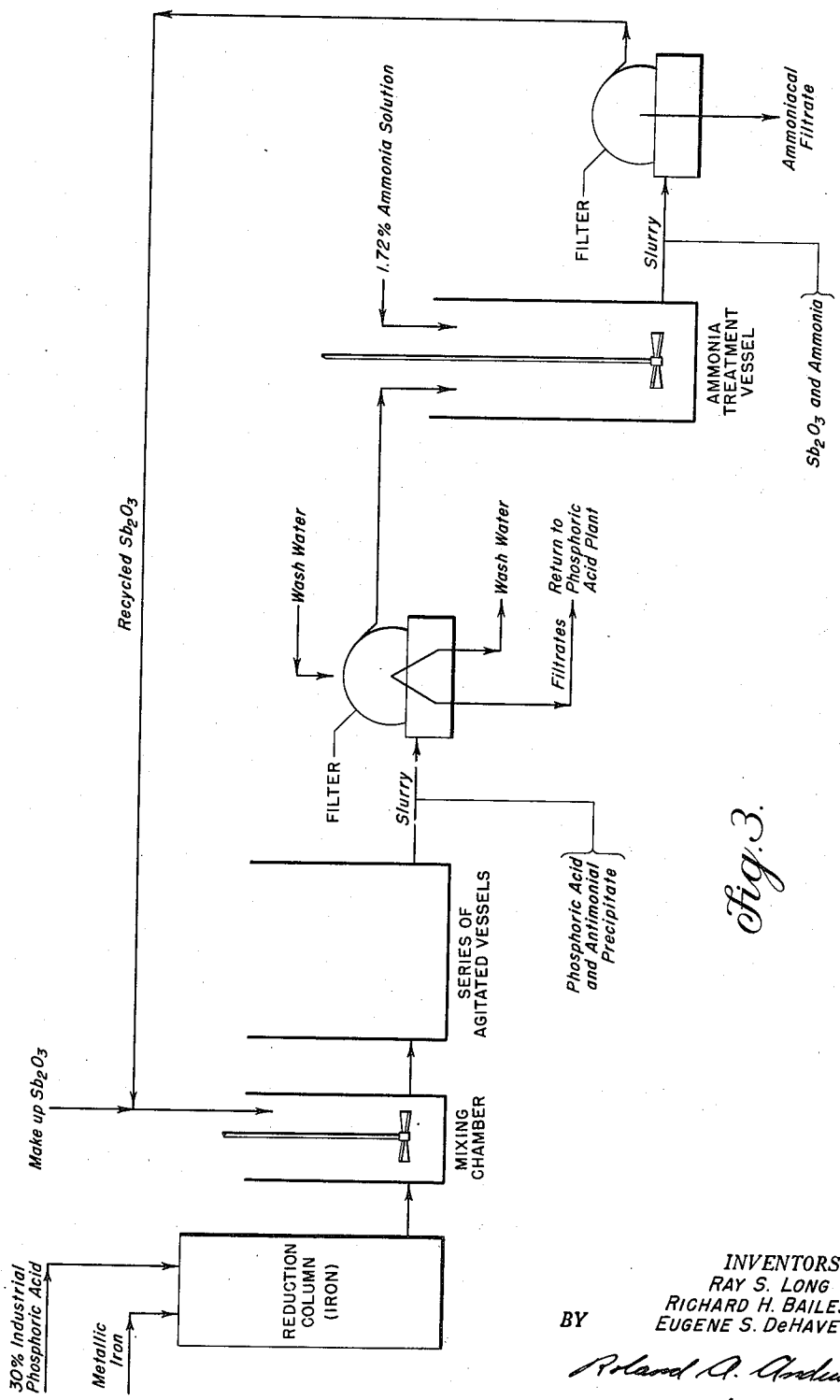
Figure 3 is a portion of a flowsheet of an industrial process for recovering uranium from industrial phosphoric acid solutions yielding an ammoniacal filtrate containing the uranium.

During the manufacture of triple-superphosphate there is obtained a phosphoric acid solution of about 30% concentration and having a composition similar to that indicated in Table I. An industrial plant process designed to treat about 500 tons a day of such an acid for the recovery of uranium may comprise the following:

With reference to Fig. 3, in accordance with the invention, 500 tons/day of industrial phosphoric acid of about 30% concentration and containing uranium equivalent to about 81.8 lbs. of $U_3O_8$, principally as a uranyl phosphate complex ion, is passed through a column containing metallic iron shavings whereupon the uranium is reduced to the tetravalent state in the solution with the consumption of about 1650 lbs./day of iron.

Following reduction, the acid is conducted into a first mixing chamber provided with means for vigorously agitating the acid where said acid is vigorously agitated to form a slurry with about 10,330 lbs./day of antimony trioxide comprising about 328 lbs./day of makeup material and about 10,002 lbs./day of material recovered and recycled later in the process which recycled material contains uranium equivalent to about 3.9 lbs. of $U_3O_8$. The slurry, which begins to react in the first vessel resulting in the coprecipitation of $SbOH_2PO_4$ with uranous phosphate and the precipitation of other materials from the solution to form the antimonial precipitate, is conducted through an appropriate series of agitated vessels in order to complete the reaction and precipitation. Upon completion of the reaction, the slurry of the antimonial precipitate in the phosphoric acid is filtered yielding about 497 tons/day of filtrate containing uranium equivalent to about 7.3 lbs. of $U_3O_8$ and antimony equivalent to about 120 lbs. of $Sb_2O_3$ which is returned to the fertilizer plant.

About 7.1 tons/day of wash water is employed to wash the antimonial precipitate which wash water carries about 1500 lbs./day of phosphoric acid, uranium equivalent to about 0.4 lb. of $U_3O_8$ and antimony equivalent to about 4 lbs. of $Sb_2O_3$ from the antimonial precipitate.

Following washing, the antimonial precipitate is treated with about 138 tons/day of ammonia solution of about 1.72% concentration in an agitated vessel whereby the $SbOH_2PO_4$ in the precipitate is converted into about 10,002 lbs./day of antimony trioxide which is filtered from the solution and is recycled as indicated above and whereby uranium and phosphate together with other materials are obtained in the ammonia solution filtrate. The ammoniacal filtrate which amounts to about 141 tons/day and contains uranium equivalent to about 74.1 lbs. of $U_3O_8$ and antimony equivalent to about 204 lbs. of $Sb_2O_3$ is then subjected to further treatment by either of two alternative methods.

Figure 4:
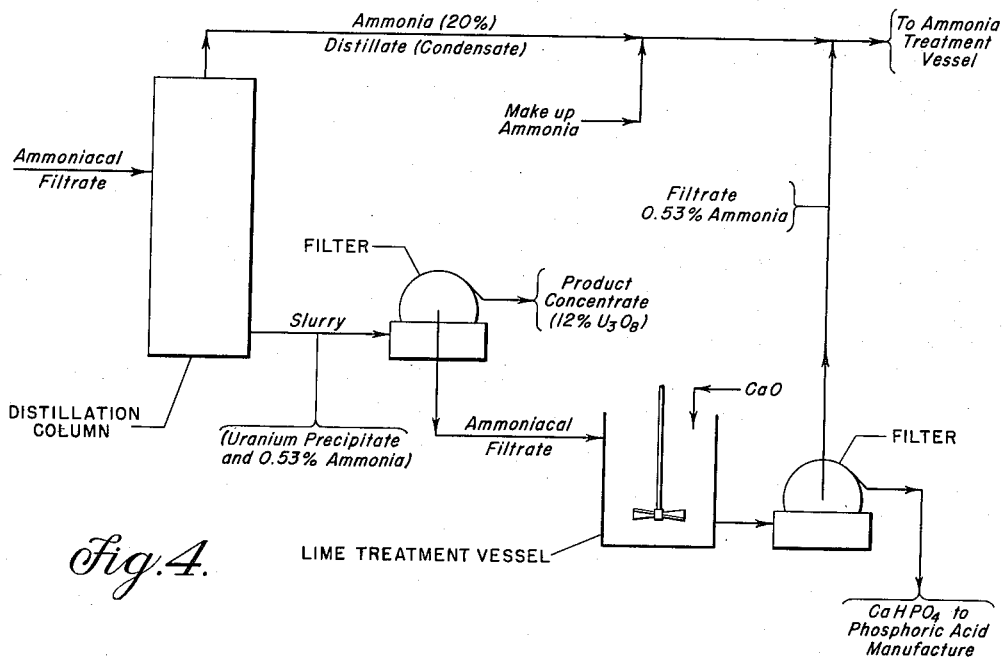
Figure 4 is a flowsheet illustrating a method of recovering uranium from the ammoniacal filtrate derived from the portion of the process illustrated in Fig. 3.

In the first alternative method, as illustrated in Fig. 4, ammonia is stripped from the ammoniacal filtrate in a suitable distillation column yielding a 20% ammonia distillate solution and resulting in the precipitation of the uranium together with other materials from the residual ammoniacal filtrate in which the concentration of ammonia has been reduced to about 0.53%. This precipitate which contains uranium concentrated, equivalently, to about 12% $U_3O_8$ on a dry basis and which concentrate also contains considerable quantities of $AlPO_4$ as well as quantities of antimony, vanadium, chromium, iron, calcium, magnesium, and titanium probably as phosphates, is filtered from the residual ammoniacal solution and may be subjected to further treatment and processing.

Dicalcium hydrogen phosphate is precipitated from the ammoniacal filtrate by the addition of lime which precipitate is filtered from the solution. This phosphatic precipitate which amounts to about 9,130 lbs./day and contains uranium equivalent to about 3.0 lbs. of $U_3O_8$ and antimony equivalent to about 173 lbs. of $Sb_2O_3$ is returned to the fertilizer plant for reconversion into phosphoric acid. The filtrate obtained after treatment with lime and which contains about 0.53% ammonia is combined with the 20% ammonia distillate obtained above and with sufficient anhydrous ammonia to yield a 1.72% ammonia solution which is recycled to the antimonial precipitate treating vessel.

Figure 5:
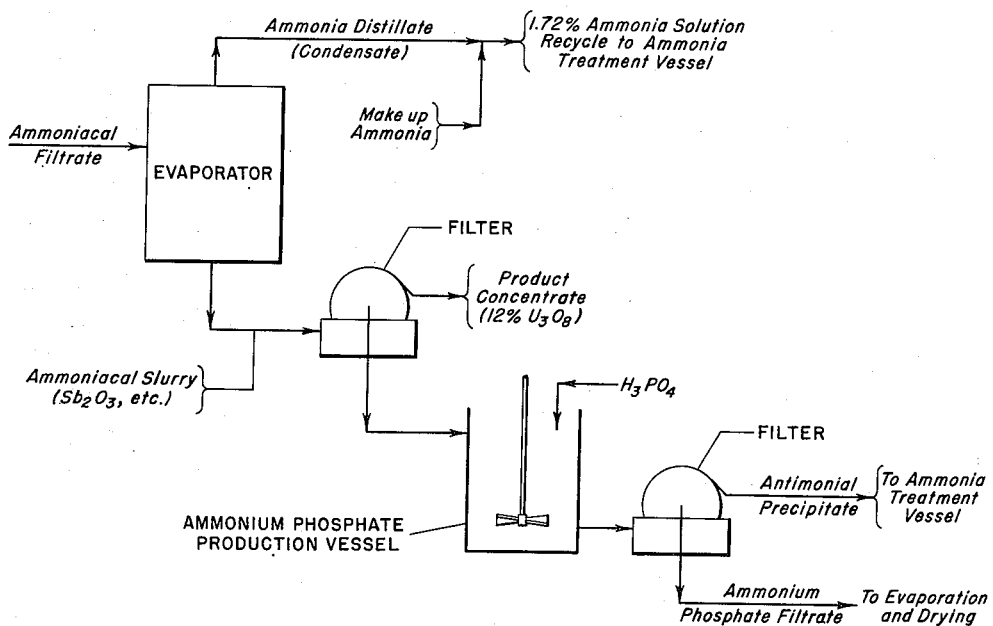
Figure 5 is a flowsheet illustrating an alternative method of recovering uranium from the ammoniacal filtrate derived from the portion of the process illustrated in Fig. 3.

In the second alternative method, as illustrated in Fig. 5, the 141 tons/day of ammoniacal filtrate is evaporated to about one-fourth volume and the evaporated ammoniacal vapors are condensed and combined with sufficient makeup ammonia and water to provide the 1.72% ammonia solution utilized in the antimonial precipitate treatment vessel. During the evaporation, the uranium precipitates together with other material to form a concentrate which, on a dry basis, amounts to 595 lbs./day and contains uranium equivalent to about 12% $U_3O_8$, (73 lbs. $U_3O_8$), antimony equivalent to 31 lbs. $Sb_2O_3$ and about 278 lbs. of phosphate which precipitate is filtered from the evaporated ammoniacal filtrate and is subjected to further treatment or processing. The filtrate so obtained is mixed with about 4300 lbs./day of phosphoric acid as, for example, 30% industrial phosphoric acid, resulting in the coprecipitation of $SbOH_2PO_4$ equivalent to about 115 lbs. of $Sb_2O_3$ and uranium equivalent to about 2 lbs. of $U_3O_8$. This precipitate is filtered from the solution and is returned to the ammonia antimonial-precipitate treatment vessel for further treatment to recover the uranium and antimony. The 41 tons/day of ammoniacal phosphate filtrate obtained as a result of the preceding treatment is evaporated to yield about 9,200 lbs. of ammonium dihydrogen phosphate which material contains uranium equivalent to about 1 lb. of $U_3O_8$ and antimony equivalent to about 58 lbs. of $Sb_2O_3$ and which material is suitable for use as a fertilizer.

Further details of the invention will become apparent from the following description of examples of processes operated in accordance with the invention.

Example A

Figure 6:
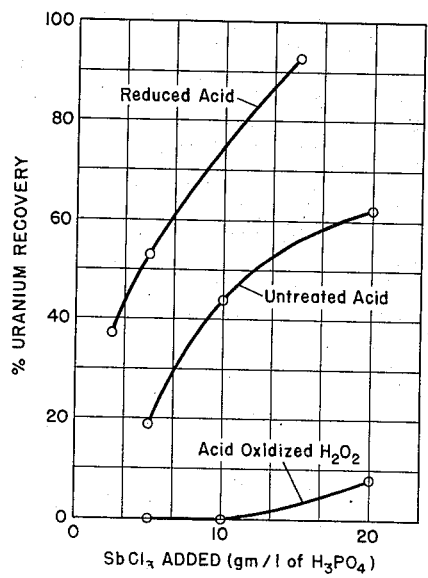
Figure 6 is a graphical illustration of the relative amounts of antimony trichloride required to precipitate uranium from solutions in various states of oxidation.

Molten antimony trichloride was poured into swirling phosphoric acid containing about 87 mg./l. of uranium and having a composition otherwise similar to that described above with the results indicated in Fig. 6. To one liter portions of the acid which had been oxidized with hydrogen peroxide, there was added 5, 10, and 20 grams, respectively, of molten antimony trichloride whereupon a white antimony oxyphosphate precipitate formed. Substantially no uranium was found in the precipitates obtained with the 5 and 10 gram amounts of the trichloride. However, an appreciable amount was found in the precipitate obtained with the 20 gram amount of the trichloride as indicated by the lower curve of Fig. 6.

Similarly, 5, 10, and 20 gram portions, respectively, of molten antimony trichloride were poured into swirling 1 liter portions of untreated phosphoric acid of the same composition. The precipitates were found to contain about 19, 44, and 62%, respectively, of the uranium originally present in the acid, all as indicated by the intermediate curve of Fig. 6.

2.5, 5, and 15 gram portions, respectively, of molten antimony trichloride were added to swirling acid of the same composition as above, which, however, had been reduced by passage through an iron packed column. Stirring was continued for 18 hours. The precipitates were found to contain about 37, 53, and 93%, respectively, of the uranium originally present in the acid, as indicated by the upper curve of Fig. 6.

Results of this experiment may be interpreted to indicate that antimony compounds precipitate the uranium most effectively when the uranium is present in the quadrivalent state. Untreated acid yields intermediate results since the uranium contained in this acid appears to be present partially in the uranyl and partially in the uranous states due to partial reduction of the acid during storage in lead containers.

Analysis of the precipitate obtained by adding 15 gm. of antimony trichloride to 1 liter of acid which precipitate weighed 14.2 gm. indicated in the following partial composition:

| | Percent |
|---|---|
| Sb | 51.8 |
| Phosphate | 27.2 |
| Chloride | 0.0 |
| Fluoride | 0.7 |
| Ferric iron | 0.0 |
| V | 0.45 |
| $U_3O_8$ (U equivalent) | 0.69 |

As the amount of antimony trichloride, which is added, is decreased, the proportion of uranium found in the precipitate is increased, however, not as complete a recovery is obtained. Addition of the molten trichloride to heated acid increases the efficiency of the precipitation, the acid being allowed to cool subsequent to said addition. Under most favorable conditions, as much as about 99% of the antimony has been found in the precipitate and that which remained in the solution has been precipitated by bubbling hydrogen sulfide gas through the solution.

While the antimonial precipitation is most efficient when the acid has been reduced, 90% of the uranium may be precipitated from unreduced acid if the quantity of antimony trichloride is increased twofold or more over that required for a similar precipitation from reduced acid. 30 grams of antimony trichloride added to 1 liter of unreduced acid resulted in the precipitation of about 90% of the uranium comparable to a similar amount precipitated by 15 grams of antimony trichloride using procedures similar to those indicated above.

10 grams of a precipitate similar to those obtained above and containing uranium equivalent to about 0.54% of $U_3O_8$ was heated with a solution of 50 grams of sodium hydroxide in 350 ml. of water for one hour resulting in the dissolution of 96% of the precipitate leaving a residue of 0.406 gr. containing uranium equivalent to about 43.3 mg. or about 11% of $U_3O_8$. Uranium equivalent to about 7.46 mg. of $U_3O_8$ was dissolved probably due to carbonate impurity in the sodium hydroxide; however, the amount of uranium dissolved may be lowered by using carbonate-free sodium hydroxide.

5 grams of a similar antimonial precipitate containing uranium equivalent to 29 mg. of $U_3O_8$ was treated with 30 ml. of a solution containing 10 grams of sodium sulfide whereupon the majority of the precipitate dissolved with the formation of thio-antimoniate in the solution leaving a residue which weighed 0.20 gram and which contained uranium equivalent to 27 mg. of $U_3O_8$. This residue, therefore, contained about 94% of the uranium and the proportion of uranium contained therein had been raised to about 14.5%.

Example B

Phosphoric acid containing uranium equivalent to 104 mg./liter of $U_3O_8$ and otherwise having a composition similar to that described above was treated with a variety of antimonial precipitants to precipitate the uranium using the conditions and with the results as summarized in Table II.

TABLE II

| | | Agitation | | Uranium |
|---|---|---|---|---|
| Volume of $H_3PO_4$ | Precipitant | Time, hr. | Temp., °C. | Precipitated, Percent |
| 1. 1,000 ml.a | 5.0 gm. $Sb_2O_3$ | 2 | 25 | 38 |
| 2. 1,000 ml.a | 10.0 gm. $Sb_2O_3$ | 2 | 25 | 68 |
| 3. 1,000 ml.a | 15.0 gm. $Sb_2O_3$ | 2 | 25 | 83 |
| 4. 100 ml.a | 0.5 gm. $Sb_2O_3$ | 1/30 | 25 | 51 |
| 5. 100 ml.a | 1.01 gm. $Sb_2O_3$ | 1/30 | 25 | 69 |
| 6. 100 ml.a | 1.50 gm. $Sb_2O_3$ | 1/30 | 25 | 72 |
| 7. 1,000 ml.a | 10.0 gm. $Sb_2O_3$ | 24 | 25 | 82 |
| 8. 1,000 ml.a | 5.0 gm. $Sb_2O_3$ | 2 | 80 | 19 |
| 9. 1,000 ml.a | 10.0 gm. $Sb_2O_3$ | 2 | 80 | 20 |
| 10. 1,000 ml.a | 15.0 gm. $Sb_2O_3$ | 2 | 80 | 65 |
| 11. 1,000 ml.a | 10.0 gm. $Sb_2O_3$ | 16 | 25 | 58 |
| 12. 1,000 ml.b | 20.0 gm. $Sb_2O_3$ | 16 | 25 | 88 |
| 13. 1,000 ml.b | 30.0 gm. $Sb_2O_3$ | 16 | 25 | 94 |
| 14. 500 ml.a | (c) | 2 | 25 | 12 |
| 15. 1,000 ml.a | 10.00 gm. $Sb_2O_3$ | 2 | 0 | 46 |
| 16. 1,000 ml.a | (d) | 2 | 25 | 85 |
| 17. 1,000 ml.a | 8.35 gm. Sb | 16 | 25 | 64 | a Acid reduced, above zero volts as measured between standard calomel and platinum electrodes, by means of iron.
b Acid as received. Partially reduced due to storage in lead container.
c 7.05 gm. of precipitate obtained in 2.
d 22.8 gm. of $KSbOC_4H_4O_6$.

It is to be noted from the above experiments that reduction of the acid and the use of increasing amounts of precipitant and agitation increase the amount of uranium precipitated. Increases in temperature at which agitation is performed tend to decrease the amount of uranium precipitated since the oxidation of the uranium to the uranyl state in the presence of air appears to be promoted thereby. As indicated by comparison between experiments 2 and 15, reduction of the temperature at which agitation is performed tends to slow the rate of uranium precipitation. Experiment 14, supra, indicates that a precipitate may be contacted with fresh portions of acid to precipitate and adsorb more uranium thereby increasing the uranium content of the precipitate.

Example C

Corresponding amounts of various antimony precipitants were employed to precipitate uranium from 1000 ml. of reduced phosphoric acid having a composition similar to that described in Table I. The acid was agitated with the precipitant for two hours at 25° C. and one hour settling time was allowed before filtration yielding the results indicated in Table III.

TABLE III

| Precipitant | Uranium Recovered |
|---|---|
| 8.35 gm. Sb | 37 |
| 10.00 gm. Sb₂O₃ | 68 |
| 15.60 gm. SbCl₃ in H₂O Solution | 81 |
| 15.60 gm. SbCl₃ in HCl Solution | 89 |

A modification of the procedure employed in the above antimony trichloride precipitations wherein cascade operation was effected was operated as follows:

16.70 grams of Sb+++ (ion equivalents) were added as an aqueous antimony trichloride solution to 1 liter of phosphoric acid containing uranium equivalent to about 105 mg. of $U_3O_8$ with agitation at 25° C. resulting in the precipitation of 98% of the uranium. This precipitate was dissolved in 50 ml. of concentrated hydrochloric acid and the solution was employed to treat a fresh liter of phosphoric acid solution resulting in the precipitation of 96% of the uranium including both that added in the precipitant solution and that in the phosphoric acid solution. This cycle was repeated twice over employing two liters of fresh phosphoric acid and 50 and 40 ml. portions, respectively, of concentrated hydrochloric acid to dissolve the precipitates resulting in the precipitation of 93.5 and 89.5%, respectively, of the uranium including that added in the precipitant solution and that present in the acid. The recoveries of uranium from each of the four individual one liter portions of acid amounted to 98, 92, 81, and 61%, respectively, of the uranium contained therein and the precipitates contained uranium equivalent to 0.32, 0.62, 0.92, and 1.08% of $U_3O_8$, respectively.

*Example D*

Ten liters of phosphoric acid containing uranium equivalent to 82.6 mg./l. of $U_3O_8$ was reduced with iron to a potential of +0.07 as measured between platinum and standard calomel electrodes then 200 gm. of antimony trichloride as a 90% aqueous solution was added to the reduced acid with agitation for 2 hours at room temperature to precipitate the uranium. About 95% of the uranium was obtained in the antimonial precipitate which weighed 200 grams and contained 52.1% of antimony, 42.6% phosphate and uranium equivalent to 0.394% of $U_3O_8$. 5 gram portions of this antimonial precipitate were leached by boiling for at least one hour with 100 ml. portions of an aqueous solution containing various amounts of Na₂S.9H₂O under the conditions and with the results indicated in Table IV, infra. The precipitates were filtered from the hot solutions and washed with cold water. As may be noted, this treatment dissolves antimony, probably as thioantimonite, and phosphate leaving most of the uranium in the residue in a considerably enriched proportion. The antimony may then be recovered from the solution and the uranium-bearing residue may be subjected to further treatment.

TABLE IV

| Na₂S.9H₂O | Residue, gm. | Uranium remaining in Residue, percent |
|---|---|---|
| 5.5 gm | 3.72 | 78 |
| 10.0 gm | 1.93 | 87 |
| 14.6 gm | 0.79 | 78 |
| 19.8 gm | 0.29 | 85 |
| 31.5 gm | 0.62 | 93 |
| 50.2 gm | 0.15 | 94 |

Similarly, 5 gram portions of this antimonial precipitate were leached by boiling with 100 ml. of sodium hydroxide solution for at least one hour under the conditions and with the results indicated in Table V, infra. The precipitates were filtered from the hot solutions and were washed with cold water.

TABLE V

| Solution N | 0.42 | 0.88 | 1.25 | 1.75 | 2.25 | 3.00 |
|---|---|---|---|---|---|---|
| gm. residue | 3.23 | 3.09 | 2.87 | 2.53 | 2.23 | 1.60 |
| mg. U₃O₈ filtrate | 3.21 | 1.43 | 1.00 | 0.22 | 0.24 | 0.14 |
| wash | 0.64 | 0.08 | 0.10 | 0.04 | 0.05 | 0.15 |
| gm. Sb filtrate | 0.05 | 0.13 | 0.28 | 0.52 | 0.74 | 1.23 |
| wash | | 0.01 | 0.01 | 0.01 | 0.01 | 0.02 |
| residue | 2.44 | 2.38 | 2.23 | 1.90 | 1.68 | 1.20 |
| gm. PO₄ filtrate | 1.91 | 2.20 | 2.20 | 2.10 | 2.15 | 2.17 |
| wash | | 0.01 | 0.01 | 0.02 | 0.02 | 0.02 |
| residue | 0.10 | 0.02 | 0.02 | 0.00 | | 0.00 |
| Percent U₃O₈ retained | 80 | 92 | 94 | 99 | 99 | 99 |

As may be noted from Table V, the caustic solution dissolves substantially all of the phosphate and the higher concentrations dissolve considerable amounts of the antimony while almost all of the uranium remains in the precipitate. A several fold enrichment of the uranium contained in the residue is thereby effected. Moreover, the uranium remaining in the residue may be dissolved and a further purification effected by the sodium carbonate leach treatment described below.

5 gram portions of the antimonial precipitate were also leached by agitation with 20 ml. portions of 5% technical sodium carbonate solution at the temperatures and with the results indicated in Table VI, infra. As a result of this leach treatment the antimonial phosphate is converted into antimony trioxide and the phosphate and uranium are obtained in the leach solution.

TABLE VI

| Temperature, °C | 90 | 70 | 50 | 30 |
|---|---|---|---|---|
| gm. precipitate | 20.0 | 5.0 | 5.0 | 5.0 |
| gm. residue | 12.07 | 3.17 | 3.14 | 3.10 |
| mg. U₃O₈ filtrate | 76 | 21.1 | 20.1 | 20.8 |
| wash | 1.7 | 1.3 | 0.7 | 0.5 |
| gm. Sb filtrate | 0.064 | 0.041 | 0.051 | 0.066 |
| wash | 0.013 | 0 | 0 | 0 |
| residue | 9.49 | 2.50 | 2.48 | 2.44 |
| gm. PO₄ filtrate | 8.15 | 2.02 | 1.91 | 2.04 |
| wash | 0.08 | 0.013 | 0.071 | 0.046 |
| residue | 0.06 | 0.087 | 0.080 | 0.059 |
| Percent U₃O₈ recovered | ¹96 | 94 | 97 | 98 |

¹ Based on total U₃O₈ found.

10.12 grams of the antimony trioxide residue remaining from the sodium carbonate leach performed at 90° C. were agitated with 1 liter of phosphoric acid, containing uranium equivalent to about 83 mg. of $U_3O_8$ and which had been reduced to a potential above zero volts (as measured between platinum and standard calomel electrodes), for one hour, yielding 14.74 grams of precipitate which contained 81% of the uranium. This uranium recovery is somewhat higher than is usual for antimony trichloride or antimony trioxide in equivalent amounts indicating that antimony trioxide produced by the foregoing method is a superior precipitant. The precipitate analyzed uranium 0.46% as $U_3O_8$; antimony, 46.5%; and phosphate, 41.3%.

*Example E*

100 ml. volumes of 0.54 M sodium hydroxide solution and 0.868 M ammonium hydroxide solution were slurried and agitated for one hour at 25° C. with 2, 4, 6, 8, 10, and 12 gram portions of an antimonial precipitate which analyzed 51.9% antimony, 41.3% of phosphate and uranium equivalent to 0.50% $U_3O_8$. Also 0.425 M sodium carbonate solution was slurried and agitated under the same conditions with the same amounts of an antimonial precipitate assaying 52.5% antimony, 40.6% phosphate and containing uranium equivalent to 0.42% $U_3O_8$.

Under the conditions noted the various reagents appeared to react with the antimonial phosphate according to the following reactions:

NaOH: $2SbOH_2PO_4 + 4OH^- = Sb_2O_3 + 2HPO_4^{--} + 3H_2O$

NH₄OH: $2SbOH_2PO_4 + 4NH_4OH =$
$Sb_2O_3 + 2HPO_4^{--} + 3H_2O + 4NH_4^+$

Na₂CO₃: $2SbOH_2PO_4 + 2CO_3^{--} =$
$Sb_2O_3 + 2HPO_4^{--} + H_2O + 2CO_2$

Also, varying quantities of antimony, uranium and phosphate were dissolved from the precipitate, all as indicated in the following table and as illustrated in accompanying Fig. 7. In said table and Fig. 7, the stoichiometric units indicated are based on the reactions of the preceding equations.

TABLE VII

| Reagent | Amt. of Reagent-Stoichiometric Units | Final pH of Leach | Percent into Solution | | |
|---|---|---|---|---|---|
| | | | $U_3O_8$ | Sb | $PO_4$ |
| 0.54 M NaOH | 3.17 | 13.8 | 35 | 14.3 | 99.5 |
| | 1.59 | 12.25 | 47 | 4.3 | 99.4 |
| | 1.06 | 8.76 | 48 | 4.3 | 98.8 |
| | 0.79 | 6.67 | 11 | 2.24 | 91.2 |
| | 0.63 | 6.52 | 8 | 1.91 | 82.8 |
| | 0.53 | 6.74 | 3 | 0.82 | 60.0 |
| 0.868 M $NH_4OH$ | 5.10 | 9.97 | 100 | 3.3 | 99.5 |
| | 2.55 | 9.62 | 100 | 3.9 | 99.6 |
| | 1.70 | 9.30 | 90 | 2.06 | 99.2 |
| | 1.27 | 8.85 | 63 | 2.89 | 98.9 |
| | 1.02 | 7.60 | 13 | 2.20 | 94.9 |
| | 0.85 | 6.72 | 10 | 2.63 | 92.7 |
| 0.425 M $Na_2CO_3$ | 5.00 | 9.98 | 98 | 5.5 | 99.0 |
| | 2.50 | 9.27 | 92 | 4.6 | 98.2 |
| | 1.67 | 8.58 | 79 | 3.37 | 96.7 |
| | 1.25 | 8.11 | 76 | 3.38 | 96.1 |
| | 1.00 | 7.62 | 51 | 3.41 | 93.5 |
| | 0.83 | 7.05 | 43 | 3.89 | 88.5 |

As may be seen from Fig. 7, phosphate removal from the antimonial precipitate is closely equivalent for similar amounts of the reagents and is directly dependent thereon. The antimony is dissolved in increasing amounts by the sodium hydroxide solutions containing above one stoichiometric equivalent of the reagent due to the formation of the soluble $SbO_2^-$ ion in solutions of high pH. Only moderate and relatively constant amounts of antimony are dissolved by either the ammoniacal or sodium carbonate solutions.

In less than equivalent amounts, ammonia never dissolves more than 10–15% of the uranium from the precipitate. As more than slightly above one equivalent of ammonia is employed, the uranium dissolution rises very rapidly, the curve rising nearly vertically at about 1.25 stoichiometric equivalents and the dissolution is nearly quantitative with twofold amounts or more of the reagent. This effect is believed to be due to the formation of uranium phosphate and/or ammonia complex ions in the solution which formation is critically dependent upon the pH of the solution. Whatever the basic reason for the rapid increase in solubility it is noted that a critical and sharp boundary condition exists for the dissolution of uranium from antimonial phosphate precipitates with ammonia.

Sodium carbonate solutions dissolve uranium quantitatively when fourfold stoichiometric amounts are employed, the amount leached dropping slowly until about 1.5 equivalents and then dropping quite rapidly with amounts below that value.

Uranium dissolution by sodium hydroxide solutions is quite low when less than about 0.8 equivalent of the reagent is employed rising quite rapidly for equivalent amounts of reagent above that value until a maximum is reached at slightly above 1.25 stoichiometric equivalents. Dissolution by this reagent appears to depend on the formation of uranium phosphate complex ions in the leaching solution. However, a competing reaction to form the insoluble hydroxide also appears to be involved which accounts for the fairly rapid decrease in the amounts of uranium dissolved by larger amounts of sodium hydroxide.

The effects noted may be employed in various ways to recover and purify uranium contained in the antimonial phosphate precipitate and to convert the antimonial material into recyclable antimony trioxide.

A double leach employing first, a leach with amounts of the reagents below the limit at which undesirable amounts of uranium are dissolved may be employed to remove major portions of the phosphate and partially convert the antimonial phosphate compound into the trioxide and then larger and more concentrated amounts of the same or of one of the other reagents above said limit may be employed to dissolve the uranium and complete the conversion. In the case of the ammonia or sodium hydroxide solutions a certain minimum concentration of phosphate or carbonate ions appears to be required for the dissolution. The uranium may then be recovered from the solution by precipitation with a precipitant such as tannic acid or by lowering of pH and/or removal of the reagent as mentioned elsewhere in this disclosure to precipitate the uranium by obtaining conditions similar to those in the lower portion of the curves.

Alternatively, larger amounts of reagents may be employed in a single leach whereby the antimonial phosphate is substantially all converted into the trioxide and uranium and phosphate are leached together into the leach solution uranium being selectively recovered in a similar manner to others indicated above.

Example F

Concentrated sodium hydroxide solution was employed to dissolve phosphate from an antimonial precipitate. (As noted in Example E, uranium dissolution decreases with amounts of sodium hydroxide above about 1.5 stoichiometric equivalents.) Portions of an antimonial phosphate precipitate assaying uranium equivalent to 0.50% $U_3O_8$ and weighing 20 and 59 grams, respectively, were slurried and agitated with 100 ml. of 9.5 N sodium hydroxide solution at 80° C. for 1 hour. The residues were filtered from the solution and washed while hot. Residues weighing 9.10 and 44.3 grams, respectively, were obtained and which contained 98.5 and 98.8%, respectively, of the uranium originally present. About 70% and 90% of the antimony and 0.2 and 10% of the phosphate, respectively, remained in the residue.

Example G 76.4 liters of 30% phosphoric acid solution which had been reduced to a potential of +0.08 v. with iron, as measured between platinum-standard calomel electrodes, containing uranium equivalent to a total of about 8.3 grams of $U_3O_8$, and having a composition otherwise similar to that indicated in Table I, was slurried and agitated with 950 grams of powdered antimony trioxide for 3.2 hours. The precipitate, which was filtered from the solution and was washed and dried weighed 1234 grams and analyzed 0.36% $U_3O_8$, 56.3% antimony and 40% phosphate. Uranium recovery amounted to 79%, which recovery is lower than usual due to inefficient agitation.

A portion of this precipitate weighing 176 grams and containing uranium equivalent to 0.63 gm. $U_3O_8$ was agitated for one hour with three liters of 1 M ammonium hydroxide solution and the residue weighing 122 grams was filtered out of the solution. The filtrate, containing uranium equivalent to 0.48 gm. $U_3O_8$, was then evaporated to about one-fourth of its original volume with the attainment of a pH of 6.4 resulting in the formation of a precipitate which after ignition weighed 4.45 gm. and contained uranium equivalent to 0.46 gm. of $U_3O_8$, or 96% of the uranium in the filtrate.

Similar experiments employing 4 M ammonium hydroxide solutions yielded similar results although the time of agitation was reduced to 15 minutes.

Portions of a stock solution formed by agitating an antimonial phosphate precipitate with two stoichiometric equivalents of 4 M ammonia as an aqueous solution for one hour and containing uranium equivalent to 0.66 gram/liter $U_3O_8$ were titrated to various final pH values with 6 N sulfuric acid solutions yielding the results tabulated below:

TABLE IX

| Final pH (40° C.) | 7.61 | 7.39 | 7.20 | 6.56 | 5.93 | 5.5 |
|---|---|---|---|---|---|---|
| Uranium ppt'd, percent | 38 | 45 | 50 | 70 | 80 | 86 |

With higher concentrations of uranium in the original precipitate as are usually obtained in more efficient precipitations, subsequent concentration and attendant recoveries are higher than shown in this example. It has been noted that if the original precipitate assays 0.50% $U_3O_8$, 90% leaching efficiency during the ammonia leach yields a solution containing uranium equivalent to 1.06 grams/liter of $U_3O_8$. About 96% of this uranium is precipitated by boiling off or stripping off ammonia until the pH of the solution is 6.5.

While there has been described in the foregoing what may be considered to be preferred embodiments of the invention, various modifications may be made therein without departing from the teachings of the invention and it is intended to cover all such modifications as fall within the scope of the appended claims.

What is claimed is:

1. The process for recovering uranium from an acidic phosphatic solution comprising reducing the uranium in said solution to the tetravalent state, then reacting a material selected from the group consisting of antimony metal, antimony trioxide, antimony trichloride and antimony tartrate with the solution to produce an antimonial phosphate precipitate containing said uranium, leaching uranium from said precipitate with a solution containing a material selected from the group consisting of ammonium hydroxide, sodium carbonate, and sodium hydroxide, and recovering uranium from the leach solution.

2. The process for recovering uranium from an acidic phosphatic solution comprising reducing the uranium in the solution to the tetravalent state, then treating said solution with a material selected from the group consisting of antimony metal, antimony trioxide, antimony trichloride, and antimony tartrate to produce an antimonial precipitate containing the uranium, leaching the uranium from the antimonial precipitate employing ammonia in amounts above about one stoichiometric equivalent, and precipitating the uranium from the leach solution by adjusting the pH of the solution to provide a lower value thereof in said solution.

3. The process as defined in claim 2, wherein said step of precipitating uranium from the leach solution is effected by the addition of acid to lower the pH of the solution.

4. The process as defined in claim 2, wherein said step of precipitating the uranium from the leach solution is effected by distilling ammonia from the solution to lower the pH of the solution.

5. The process for recovering uranium from an acidic phosphatic solution comprising reducing the uranium in said solution to the tetravalent state, then reacting a material selected from the group consisting of antimony metal, antimony trioxide, antimony trichloride, and antimony tartrate with said solution to produce an antimonial phosphate precipitate containing said uranium, leaching phosphate from said precipitate employing a material selected from the group consisting of ammonium hydroxide, sodium carbonate, and sodium hydroxide in amounts less than about one stoichiometric equivalent, then leaching uranium from the precipitate employing an additional amount of one of said materials, and precipitating uranium from the leach solution by adjusting the pH of the solution to a more acid condition.

6. In a process for recovering uranium from an acidic phosphatic solution, the steps comprising reducing said uranium to the tetravalent state in the solution, reacting a material selected from the group consisting of antimony metal, antimony trioxide, antimony trichloride, and antimony tartrate with said solution to produce an antimonial phosphate precipitate containing said uranium, and leaching the antimonial phosphate precipitate with sodium sulfide solution to remove antimony from the precipitate, thereby enhancing the proportion of uranium contained therein.

7. The process for recovering uranium from an acidic phosphatic solution comprising reducing the uranium to the tetravalent state in said solution, then reacting a material selected from the group consisting of antimony metal, antimony trichloride, antimony trioxide, and antimony tartrate with said solution to produce an antimonial phosphate precipitate containing said uranium, leaching said precipitate with ammonia in an amount in excess of one stoichiometric equivalent to leach the uranium and most of the phosphate therefrom, and precipitating uranium from the leach solution by distilling ammonia therefrom.

8. The process for recovering uranium from an acidic phosphatic solution comprising reducing the uranium to the tetravalent state in said solution, then reacting a material selected from the group consisting of antimony metal, antimony trioxide, antimony trichloride, and antimony tartrate with said solution to produce an antimonial phosphate precipitate containing said uranium, leaching said precipitate with ammonia in amounts in excess of about one stoichiometric equivalent to dissolve uranium and phosphate from the precipitate and convert the antimonial phosphate into antimony trioxide, recycling the antimony trioxide to precipitate uranium from an acidic phosphatic solution, precipitating uranium from the ammoniacal leach liquor by distilling ammonia therefrom, filtering the precipitate from the leach liquor, recombining the ammonia distilled from the leach liquor with the leach liquor filtrate, precipitating phosphate from the leach liquor filtrate, and recycling the leach liquor filtrate to leach an antimonial phosphate precipitate.

9. The process for recovering uranium from an acidic phosphatic solution comprising reducing the uranium to the tetravalent state in said solution, then reacting a material selected from the group consisting of antimony metal, antimony trioxide, antimony trichloride, and antimony tartrate with said solution to produce an antimonial phosphate precipitate containing said uranium, leaching said precipitate with ammonia in amounts in excess of about one stoichiometric equivalent to dissolve uranium and phosphate from the precipitate and convert the antimonial phosphate into antimony trioxide, recycling the antimony trioxide to precipitate uranium from an acidic phosphatic solution, precipitating uranium from the ammoniacal leach liquor by distilling ammonia therefrom, recycling the distilled ammonia to leach an antimonial precipitate, filtering the precipitate from the leach liquor, and preparing ammonium phosphate from the leaching liquor by adding phosphoric acid thereto and evaporating the mixture.

10. In a process for recovering uranium from an acidic phosphatic solution, the steps comprising reducing the uranium in said solution to the tetravalent state, then reacting a material selected from the group consisting of antimony metal, antimony trioxide, antimony trichloride, and antimony tartrate with said solution to produce an antimonial phosphate precipitate containing the uranium, and dissolving antimony and phosphate from the precipitate with an excess of sodium hydroxide, thereby enhancing the proportion of uranium contained in the residual precipitate.

11. The process for recovering uranium from an acidic phosphatic solution comprising reducing the uranium to the tetravalent state in the solution, then reacting a material selected from the group consisting of antimony metal, antimony trioxide, antimony trichloride, and antimony tartrate with the solution to produce an antimonial phosphate precipitate containing the uranium, dissolving antimony and phosphate from the precipitate with a solution of a material selected from the group consisting of sodium sulfide and sodium hydroxide, leaching uranium from the residual precipitate by reaction with sodium carbonate solution, whereby the residual precipitate is converted into antimony trioxide and uranium and phosphate are obtained in the leach solution, recycling the antimony trioxide to precipitate uranium from an acidic phosphatic solution, and recovering uranium from said leach solution.

12. In a process for recovering uranium from an acidic phosphatic solution, the steps comprising reducing the uranium to the tetravalent state in the solution, then reacting a material selected from the group consisting of antimony metal, antimony trioxide, antimony trichloride, and antimony tartrate with a portion of the solution to produce an antimonial phosphate precipitate containing the uranium, separating said precipitate from the solution, dissolving the separated precipitate in concentrated hydrochloric acid, adding the hydrochloric acid solution obtained by dissolving said precipitate to a fresh portion of said reduced acidic phosphatic solution to produce an antimonial phosphate precipitate containing uranium present in the original precipitate and fresh portion of acidic phosphatic solution, and repeating said separation, dissolution and precipitation steps with fresh portions of reduced acidic phosphatic solution.

13. In a process for recovering uranium from an acidic phosphatic solution, the step comprising reacting a material selected from the group consisting of antimony metal, antimony trioxide, antimony trichloride and antimony tartrate with said solution to produce an antimonial precipitate containing said uranium.

No references cited.